(12) United States Patent
Chung et al.

(10) Patent No.: US 9,819,048 B2
(45) Date of Patent: Nov. 14, 2017

(54) METHOD OF MANUFACTURING SECONDARY BATTERY

(71) Applicant: LG Chem, Ltd., Seoul (KR)

(72) Inventors: Mikyung Chung, Daejeon (KR); Soojin Kim, Daejeon (KR); Sung-Kyun Chang, Daejeon (KR); In Sung Uhm, Daejeon (KR); Won Seok Chang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/422,303

(22) PCT Filed: Nov. 8, 2013

(86) PCT No.: PCT/KR2013/010103
§ 371 (c)(1),
(2) Date: Feb. 18, 2015

(87) PCT Pub. No.: WO2014/073897
PCT Pub. Date: May 15, 2014

(65) Prior Publication Data
US 2015/0244016 A1    Aug. 27, 2015

(30) Foreign Application Priority Data
Nov. 8, 2012 (KR) .......................... 10-2012-0125795

(51) Int. Cl.
*H01M 10/052* (2010.01)
*H01M 10/04* (2006.01)
(Continued)

(52) U.S. Cl.
CPC ........... *H01M 10/049* (2013.01); *H01M 2/02* (2013.01); *H01M 2/0202* (2013.01);
(Continued)

(58) Field of Classification Search
CPC ....................... H01M 10/052; H01M 10/0525
See application file for complete search history.

(56) References Cited

U.S. PATENT DOCUMENTS

| 2,996,038 A | 8/1961 | Hunicke |
| 6,589,694 B1 | 7/2003 | Gosho et al. |

(Continued)

FOREIGN PATENT DOCUMENTS

| CN | 102612767 A | 7/2012 |
| JP | H03-53448 A | 3/1991 |

(Continued)

OTHER PUBLICATIONS

International Search Report for Application No. PCT/KR2013/010106 dated Jan. 22, 2014.

(Continued)

*Primary Examiner* — Olatunji Godo
(74) *Attorney, Agent, or Firm* — Lerner, David, Littenberg, Krumholz & Mentlik, LLP

(57) ABSTRACT

Disclosed is a method of manufacturing a secondary battery wherein an electrode assembly impregnated with an electrolytic solution is embedded in a battery case,
wherein interfacial contact properties (i.e. wetting) of the electrode assembly and the electrolytic solution are improved through a process including:
(a) impregnating an electrode assembly having a separator interposed between a cathode and an anode with an electrolytic solution; and
(b) applying vibration having a frequency of 20 to 100 kHz to an electrolytic solution with which the electrode assembly is impregnated.

(Continued)

A secondary battery manufactured according to the method may have improved ionic conductivity, electronic conductivity and the like and, as such, may have improved electrochemical performance.

14 Claims, 1 Drawing Sheet

(51) Int. Cl.
| | |
|---|---|
| H01M 2/36 | (2006.01) |
| H01M 10/058 | (2010.01) |
| H01M 2/02 | (2006.01) |
| H01M 10/0568 | (2010.01) |
| H01M 10/0569 | (2010.01) |

(52) U.S. Cl.
CPC ........... *H01M 2/0237* (2013.01); *H01M 2/36* (2013.01); *H01M 10/052* (2013.01); *H01M 10/058* (2013.01); *H01M 2/362* (2013.01); *H01M 10/0568* (2013.01); *H01M 10/0569* (2013.01); *H01M 2220/20* (2013.01); *H01M 2220/30* (2013.01); *H01M 2300/0037* (2013.01); *Y02T 10/7011* (2013.01); *Y10T 29/49115* (2015.01)

(56) References Cited

U.S. PATENT DOCUMENTS

| | | | | |
|---|---|---|---|---|
| 2002/0106554 | A1* | 8/2002 | Nemoto | H01M 2/361 429/72 |
| 2004/0068863 | A1* | 4/2004 | Cintra | H01M 2/361 29/623.1 |
| 2007/0209584 | A1* | 9/2007 | Kalynushkin | C23C 4/12 118/311 |
| 2010/0173187 | A1* | 7/2010 | Nishikawa | H01M 2/145 429/129 |
| 2010/0209782 | A1* | 8/2010 | Choi | H01M 4/0452 429/332 |
| 2011/0097630 | A1* | 4/2011 | Choi | H01M 2/0257 429/246 |
| 2012/0034531 | A1 | 2/2012 | Senda et al. | |
| 2013/0065111 | A1 | 3/2013 | Kim et al. | |

FOREIGN PATENT DOCUMENTS

| | | |
|---|---|---|
| JP | 10-050296 A | 2/1998 |
| JP | 2006-294282 A | 10/2006 |
| JP | 2007096048 A | 4/2007 |
| KR | 20000061587 A | 10/2000 |
| KR | 100528900 B1 | 11/2005 |
| KR | 20070082927 A | 8/2007 |
| KR | 20110101331 A | 9/2011 |
| KR | 101134122 B1 | 4/2012 |
| KR | 20120033647 A | 4/2012 |

OTHER PUBLICATIONS

International Search Report for Application No. PCT/KR2013/010103 dated Jan. 22, 2014.

International Search Report for Application No. PCT/KR2013/010105 dated Jan. 22, 2014.

* cited by examiner

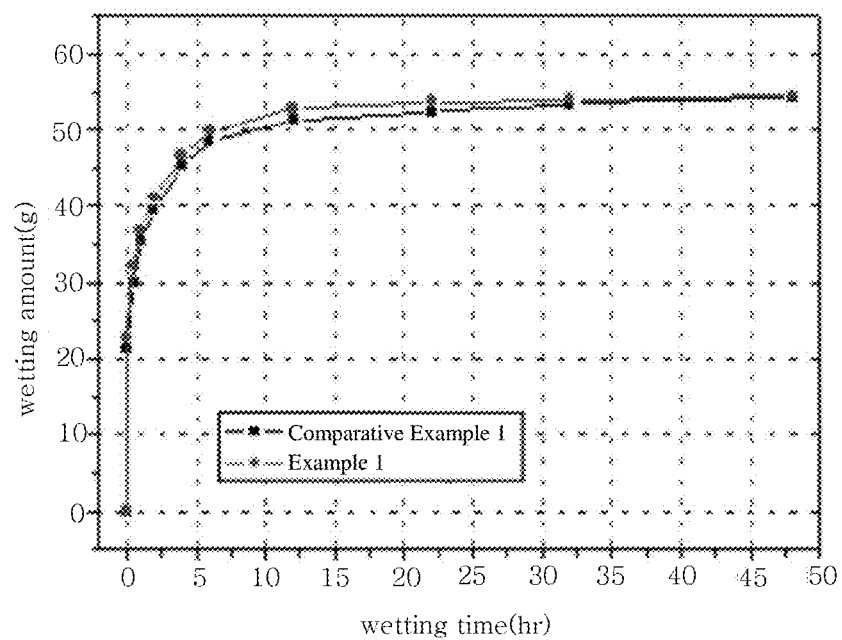

METHOD OF MANUFACTURING SECONDARY BATTERY

CROSS-REFERENCE TO RELATED APPLICATION

This application is a national phase entry under 35 U.S.C. §371 of International Application No. PCT/KR2013/010103, filed Nov. 8, 2013, which claims priority to Korean Patent Application No. 10-2012-0125795, filed on Nov. 8, 2012, the disclosures of which are incorporated herein by reference.

TECHNICAL FIELD

The present invention relates to a method of manufacturing a secondary battery wherein an electrode assembly impregnated with an electrolytic solution is embedded in a battery case, wherein interfacial contact properties (i.e. wetting) of the electrode assembly and the electrolytic solution are improved through a process including:

(a) impregnating an electrode assembly having a separator interposed between a cathode and an anode with an electrolytic solution; and (b) applying vibration having a frequency of 20 to 100 kHz to an electrolytic solution with which the electrode assembly is impregnated.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A lithium secondary battery has a structure in which an electrode assembly, in which a porous separator is interposed between a cathode and an anode, each of which includes an active material coated on an electrode current collector, is impregnated with a lithium salt-containing non-aqueous electrolytic solution.

A general lithium secondary battery assembly process is performed by finally injecting an electrolytic solution into a battery case after alternately stacking a cathode, an anode and a separator and then inserting the cathode, the anode and the separator into the battery case made of a can or a pouch having a certain size and shape. Here, the finally injected electrolytic solution infiltrates a cathode, an anode and a separator by capillary force. However, due to material characteristics such as a cathode, an anode and a separator which are hydrophobic, and an electrolytic solution which is hydrophilic, substantial time and a difficult process are required until an electrode and a separator are wetted with an electrolytic solution.

In addition, devices or equipment are being enlarged and thereby volume, into which an electrolytic solution is infiltrated, reduces and area, into an electrolytic solution is infiltrated, increases, and, accordingly, there is a high possibility that an electrolytic solution does not enter a battery and locally exists outside. The amount of an electrolytic solution in a battery manufactured according to such a process battery is partially insufficient, and thereby battery capacity and performance are dramatically reduced.

To improve electrode wetting properties, methods such as injecting an electrolytic solution at high temperature, injecting an electrolytic solution at added or reduced pressure, or the like are used. However, when the methods are used, an electrode assembly and an electrolytic solution may be transformed and thereby problems such as internal short circuit and the like may occur.

Therefore, there is an urgent need for a method of manufacturing a secondary battery having stability at high temperature and improved wetting properties.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a secondary battery is manufactured by including applying a predetermined frequency to an electrolytic solution with which an electrode assembly is impregnated, desired effects may be obtained, thus completing the present invention.

Technical Solution

In accordance with one aspect of the present invention, provided is a method of manufacturing a secondary battery wherein an electrode assembly impregnated with an electrolytic solution is embedded in a battery case, wherein interfacial contact properties (i.e. wetting) of the electrode assembly and the electrolytic solution are improved through a process including:

(a) impregnating an electrode assembly having a separator interposed between a cathode and an anode with an electrolytic solution; and (b) applying vibration having a frequency of 20 to 100 kHz to an electrolytic solution with which the electrode assembly is impregnated.

That is, the method of manufacturing the secondary battery according to the present invention includes applying a predetermined vibration to an electrolytic solution with which an electrode assembly is impregnated. Accordingly, mobility of electrolytic solutions may be increased and thereby interfacial contact properties, namely, wetting properties, of an electrode assembly and an electrolytic solution may be improved.

The vibration of step (b) may be performed by a variety of media.

As one embodiment, the vibration may be performed by ultrasonic waves of 20 to 100 kHz.

That is, ultrasonic waves may give external shock to particles due to intrinsic high frequency and electrolytic solutions shake at the molecular level by the external shock, and thereby mobility of electrolytic solutions may be maximized, and, accordingly, interfacial contact properties (wetting properties) of an electrode may be improved.

In particular, step (b) may be performed by ultrasonic waves having a frequency of 25 to 80 kHz and an amplitude of 2 to 30 μm.

The frequency and the amplitude are optimal values to improve interfacial contact properties between an electrode assembly and an electrolytic solution by maximizing mobility of electrolytic solutions. Therefore, when frequency and amplitude are lower than the values described above, desired effects may not be obtained. On the other hand, when frequency and amplitude are higher than the values described above, efficiency of a manufacturing process is reduced.

The ultrasonic waves may be applied once and, to increase efficiency, may be periodically or aperiodically applied twice or more.

The electrolytic solution includes a lithium salt and a non-aqueous solvent. The electrolytic solution may be a non-aqueous organic solvent, an organic solid electrolyte, an inorganic solid electrolyte and the like, but the invention is not limited thereto.

The lithium salt is a material that is readily soluble in the non-aqueous electrolytic solution and examples thereof include at least one selected from the group consisting of LiCl, LiBr, LiI, LiClO$_4$, LiBF$_4$, Li$B_{10}Cl_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, 4-phenylboronic acid lithium and imides.

In the present invention, mobility of electrolytic solutions improved by vibration applied to an electrolytic solution may be affected by types and the amounts of electrolytic solutions.

Accordingly, the electrolytic solution may be a non-aqueous organic solvent. In this case, the non-aqueous organic solvent may include 1 to 90 wt % of a cyclic carbonate and 10 to 99 wt % of a linear carbonate based on a total weight of a non-aqueous solvent, particularly 1 to 80 wt % of a cyclic carbonate and 20 to 99 wt % of a linear carbonate based on a total weight of a non-aqueous solvent.

The cyclic carbonate, for example, may be at least one selected from the group consisting of ethylene carbonate (EC), propylene carbonate (PC), and butylene carbonate (BC).

The linear carbonate, for example, may be at least one selected from the group consisting of dimethyl carbonate (DMC), diethyl carbonate (DEC), ethylmethyl carbonate (EMC), and methyl propionate (MP).

The types and the amounts of the electrolytic solutions are optimal ranges to improve interfacial contact properties between an electrode assembly and an electrolytic solution by maximizing mobility of electrolytic solutions and, accordingly, when types and amounts of the electrolytic solutions are outside the ranges, desired effects of the present invention are not obtained.

A viscosity of the electrolytic solution to which the vibration is applied may be 0.1 cP or more and 5 cP or less, particularly 2 cP or more and 4 cP or less. Generally, in case of an electrolytic solution having high viscosity, interfacial contact properties between an electrode assembly and an electrolytic solution are reduced and thereby impregnation properties of an electrode assembly may be reduced. However, the present invention applies predetermined vibration to an electrolytic solution and thereby may exhibit desired effects in the high viscosity electrolytic solution described above.

The present invention provides a secondary battery manufactured according to the manufacturing method.

For example, an impregnation amount of an electrolytic solution of an electrode assembly located in the secondary battery internal may be 120% to 140% of an impregnation amount of an electrode assembly located in a secondary battery to which vibration is not added.

Such a secondary battery may be particularly a lithium secondary battery.

Hereinafter, constituents of such a lithium secondary battery will be described.

The lithium secondary battery includes a cathode fabricated by drying and pressing after coating a mixture of a cathode active material, a conductive material and a binder on a cathode collector, and an anode fabricated in the same manner. In this case, as desired, the mixture may further include a filler.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

As the cathode active material, layered compounds such as lithium cobalt oxide (LiCoO$_2$) and lithium nickel oxide (LiNiO$_2$), or compounds substituted with one or more transition metals; lithium manganese oxides such as compounds of Formula Li$_{1+x}$Mn$_{2-x}$O$_4$ where 0≤x≤0.33, LiMnO$_3$, LiMn$_2$O$_3$, and LiMnO$_2$; lithium copper oxide (Li$_2$CuO$_2$); vanadium oxides such as LiV$_3$O$_8$, LiV$_3$O$_4$, V$_2$O$_5$, and Cu$_2$V$_2$O$_7$; Ni-site type lithium nickel oxides having the formula LiNi$_{1-x}$M$_x$O$_2$ where M=Co, Mn, Al, Cu, Fe, Mg, B, or Ga, and 0.01≤x≤0.3; lithium manganese composite oxides having the formula LiMn$_{2-x}$M$_x$O$_2$ where M=Co, Ni, Fe, Cr, Zn, or Ta, and 0.01≤x≤0.1 or the formula Li$_2$Mn$_3$MO$_8$ where M=Fe, Co, Ni, Cu, or Zn; LiMn$_2$O$_4$ where some of the Li atoms are substituted with alkaline earth metal ions; disulfide compounds; Fe$_2$(MoO$_4$)$_3$; and LiNi$_x$Mn$_2$O$_4$ where 0.01≤x≤0.6 may be used.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The anode current collector is generally fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

Such a lithium secondary battery may be structured such that a structure that an electrode assembly having a separator interposed between a cathode and an anode is impregnated with a lithium salt-containing electrolytic solution.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolytic solution includes an electrolytic solution and a lithium salt as described above, and the electrolytic solution may be a non-aqueous organic solvent, an organic solid electrolyte, an inorganic solid electrolyte, or the like. However, the present invention is not limited thereto.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolytic solution. In some cases, in order to impart incombustibility, the electrolytic solution may further include a halogen-containing solvent such as carbon tetrachloride and ethylene trifluoride. In addition, in order to improve high-temperature storage characteristics, the electrolytic solution may further include carbon dioxide gas, fluoro-ethylene carbonate (FEC), propene sultone (PRS), or the like.

In a preferred embodiment, a lithium salt-containing non-aqueous electrolytic solution may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

A battery pack including the lithium secondary battery may be used as a power source of vehicles that require high-temperature stability, long cycle characteristics, high rate characteristics, and the like.

Examples of the vehicles include electric vehicles (EVs), hybrid electric vehicles (HEVs), plug-in hybrid electric vehicles (PHEVs), and the like, but the present invention is not limited thereto.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph illustrating impregnation amounts according to time of an electrode assembly according to Experimental Example 1.

MODE FOR INVENTION

Now, the present invention will be described in more detail with reference to the accompanying drawings. These examples are provided for illustrative purposes only and should not be construed as limiting the scope and spirit of the present invention.

Example 1

A porous separator was interposed between a cathode including a cathode active material and an anode including an anode active material to manufacture an electrode assembly. The electrode assembly was embedded in a battery case and then a non-aqueous lithium electrolytic solution including ethylene carbonate and ethylmethyl carbonate mixed in a volumetric ratio of 3:7 was injected thereinto. Subsequently, vibration having a frequency of 40 kHz was applied thereto, resulting in completion of a secondary battery.

Comparative Example 1

A secondary battery was manufactured in the same manner as in Example 1, except that vibration was not applied to an electrolytic solution.

Experimental Example 1

In each of Example 1 and Comparative Example 1, the amount of an impregnated electrolytic solution according to time was measured after injecting an electrolytic solution. Results are illustrated in FIG. 1 below.

In accordance with FIG. 1 below, it can be confirmed that the secondary battery, in which vibration was added to an electrolytic solution, manufactured according to Example 1 exhibits improved electrolytic solution impregnation amount and impregnation rate when compared to the secondary battery, in which vibration was not added to an electrolytic solution, manufactured according to Comparative Example 1.

INDUSTRIAL APPLICABILITY

As described above, a method of manufacturing a secondary battery according to the present invention includes applying a predetermined frequency to an electrolytic solution with which an electrode assembly is impregnated. Accordingly, electrolytic solution impregnation properties, ionic conductivity, electronic conductivity and the like are improved and, as such, electrochemical performance of a secondary battery manufactured according to the method may be improved.

The invention claimed is:

1. A method of manufacturing a secondary battery where an electrode assembly impregnated with an electrolytic solution is embedded in a battery case,
wherein interfacial contact properties (i.e. wetting) of the electrode assembly and the electrolytic solution are improved through a process comprising:
forming an electrode assembly by interposing a separator between a cathode and an anode;
impregnating the formed electrode assembly with an electrolytic solution; and
after impregnating the formed electrode assembly with the electrolytic solution, applying vibration having a frequency of 20 to 100 kHz to the electrolytic solution with which the electrode assembly has been impregnated,
wherein the vibration is a periodic physical movement applied by ultrasonic waves having the frequency of 20 to 100 kHz.

2. The method according to claim 1, wherein, in the applying, the vibration has an amplitude of 2 to 30 μm.

3. The method according to claim 1, wherein the vibration is applied once, or periodically or aperiodically twice or more.

4. The method according to claim 1, wherein the electrolytic solution comprises a lithium salt and a non-aqueous solvent.

5. The method according to claim 4, wherein the lithium salt is at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, 4 phenyl-boronic acid lithium and imides.

6. The method according to claim 4, wherein the electrolytic solution comprises 1 to 80 wt % of a cyclic carbonate and 20 to 99 wt % of a linear carbonate based on a total weight of a non-aqueous solvent.

7. The method according to claim 6, wherein the cyclic carbonate is at least one selected from the group consisting of ethylene carbonate (EC), propylene carbonate (PC), and butylene carbonate (BC).

8. The method according to claim 6, wherein the linear carbonate is at least one selected from the group consisting of dimethyl carbonate (DMC), diethyl carbonate (DEC), ethylmethyl carbonate (EMC), and methyl propionate (MP).

9. The method according to claim 1, wherein viscosity of the electrolytic solution is 0.1 cP or more and 5 cP or less.

10. The method according to claim 1, wherein viscosity of the electrolytic solution is 1 cP or more and 4 cP or less.

11. A secondary battery manufactured using the method according to claim 1.

12. The secondary battery according to claim 11, wherein impregnation amount of an electrolytic solution of an electrode assembly locating in the secondary battery is 120% to 140% of an impregnation amount of an electrode assembly to which vibration is not applied.

13. The secondary battery according to claim 11, wherein the secondary battery is a lithium secondary battery.

14. The method according to claim 1, further comprising embedding the electrode assembly in a battery case before the step of impregnating the electrode assembly.

* * * * *